United States Patent

[11] 3,610,777

| [72] | Inventor | Joseph A. Wagle<br>Indianapolis, Ind. |
|---|---|---|
| [21] | Appl. No. | 37,731 |
| [22] | Filed | May 15, 1970 |
| [45] | Patented | Oct. 5, 1971 |
| [73] | Assignee | General Motors Corporation<br>Detroit, Mich. |

[54] COMPOSITE DRUM ROTOR
6 Claims, 4 Drawing Figs.

| [52] | U.S. Cl. | 416/198,<br>416/244, 416/218 |
|---|---|---|
| [51] | Int. Cl. | F01d 5/06 |
| [50] | Field of Search | 416/198–<br>201, 218, 244, 213 |

[56] References Cited
UNITED STATES PATENTS

| 2,786,625 | 3/1957 | Kent et al. | 416/201 |
|---|---|---|---|
| 3,501,090 | 3/1970 | Stoffer et al. | 416/230 X |
| 3,519,368 | 7/1970 | Howald | 416/230 X |
| 3,532,438 | 10/1970 | Palfreyman et al. | 416/230 X |
| 3,554,667 | 1/1971 | Wagle | 416/218 X |

*Primary Examiner*—Everette A. Powell, Jr.
*Attorneys*—Paul Fitzpatrick and Jean L. Carpenter ABSTRACT: A compressor is made of alternating bladed rings and spacer rings stacked together. Both the bladed rings and the spacer rings are encircled by fibrous composite material reinforcing rings. The bladed rings include radially inner rings coupled by face splines and an expanding internal ring which holds the face splines engaged.

INVENTOR.
Joseph A. Wagle
BY Paul Fitzpatrick
ATTORNEY

COMPOSITE DRUM ROTOR

"The invention herein described was made in the course of work under a contract or subcontract thereunder with the Department of Defense."

DESCRIPTION

My present invention relates to improvements in high speed lightweight rotating structures, particularly composite drum type rotors for compressors and the like.

As is well known by those skilled in the art, there is a great need to minimize weight and material content in many compressors and other turbomachines, particularly those for aircraft engines. It is also necessary that the structures be reliable and be assembled with reasonable ease and usually that the cost not be excessive.

Fibrous composite materials, by which I mean composites of very high strength fibers or filaments of materials such, for example, as carbon or boron, embedded in a suitable matrix such, for example, as an epoxy resin offer a great deal to the designer of high-speed turbomachinery from the standpoint of very high tensile or burst strength in relation to weight. My prior U.S. Pat. application Ser. No. 823,608 filed May 12, 1969 for Turbomachine Rotor and my companion application docket No. A–12,586 for Bladed Rotor filed in the same date as this application (both of common ownership with the present application) are directed to lightweight rotor structures advantageously employing such high tensile strength composite material as reinforcing rings for the rotor.

The present application, while embodying some of the principles of the applications referred to above, represents a further extension of the art of high-speed lightweight rotors.

The structure to which the present invention is directed is distinct form those previously referred to in various ways, among them the fact that it is principally directed to a composite rotor made up of abutting rings which are joined together adjacent the rim of the rotor to form a drum and in which a tie bolt or equivalent structure to hold the stack of rings together is dispensed with.

The present invention also involves structures in which both the blade-carrying rings and the spacer rings disposed between them are reinforced by fibrous composite rings and in which the spacer rings are piloted over the bladed rings.

The principal objects of my invention are to provide improved structures for turbomachine rotor of the drum type; to increase the reliability and strength of such rotors and to decrease the weight and cost of fabrication of such rotors. A further object is to provide improved arrangements for joining the successive rings of a rotor drum into a unitary structure.

The nature of my invention and its advantages will be clear to those skilled in the art from the succeeding detailed description and drawings of two preferred embodiments of the invention.

Before proceeding to a detailed description of structures embodying my invention, it may be well to point out some background. Turbomachine rotors of the axial flow-type operate in conjunction with a bladed stator structure, the two providing alternating rows of rotating and stationary blades. Ordinarily, the radially inner ends of the stationary blades bear shrouds which cooperate with the outer surface of the rotor between the individual blade rows. It has been known to provide spacer rings between individual wheels or rings to define the surface of a drum-type rotor, and it has been known to provide various means for securing the successive wheels or rings together and to provide end bells or the like at each end of the rotor including stub shafts which may be mounted in bearings. My invention is not particularly concerned with the arrangement of the end bells but rather with the rotor structure between the ends.

The following United States patents may be referred to as examples of prior art composite rotor structures: Miller, U.S. Pat. No. 2,614,796 for Rotor Construction, Oct. 21, 1952; Lombard et al., U.S. Pat. No. 2,618,463 for Multistage Axial Compressor and Turbine, Nov. 18, 1952; Pedersen et al., U.S. Pat. No. 2,650,017 for Gas Turbine Apparatus, Aug. 25, 1953; and Willgoos, U.S. Pat. No. 2,672,279 for End Bell Construction, March 16, 1954.

Figures 1, 2:
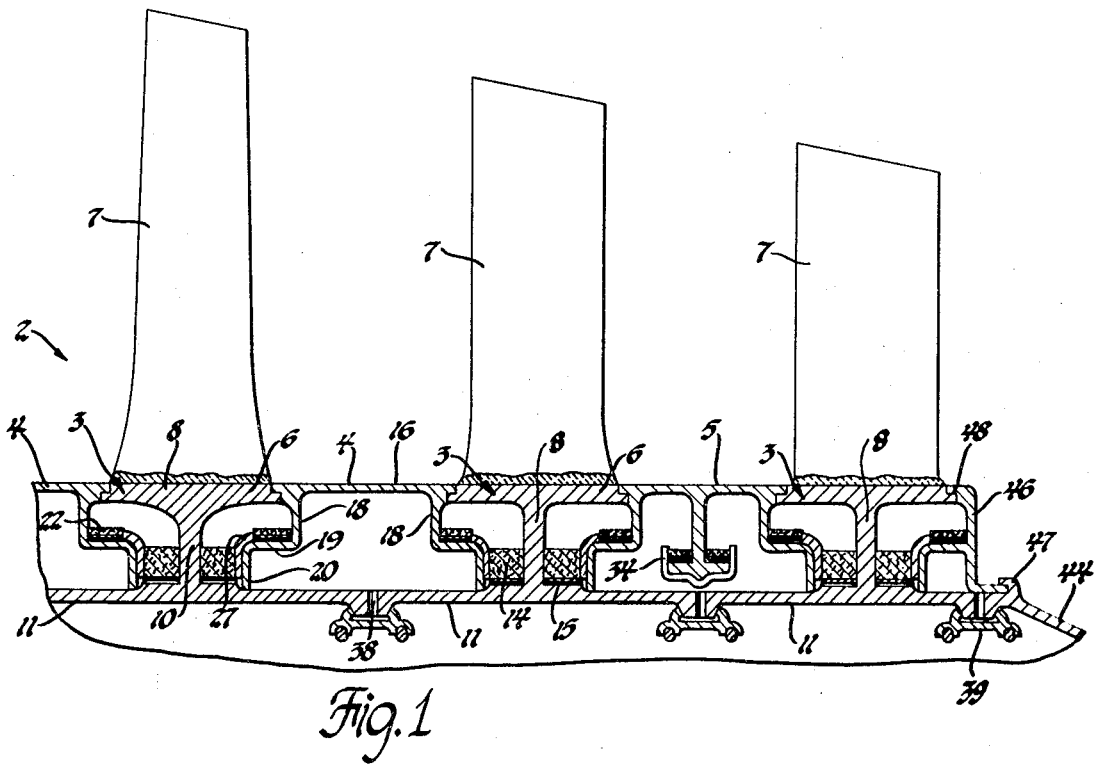
FIG. 1 is a section, taken on a plane containing the axis of rotation thereof, of the high pressure end of a compressor rotor.
FIG. 2 is an enlarged view of a portion of the same illustrating details of structure.

Referring first to FIGS. 1 and 2, a rotor 2 comprises a number of coaxial bladed rings 3 with spacer rings 4 and 5 disposed between them. Each bladed ring 3 comprises a blade mounting ring 6 and a row of airfoil section blades 7 extending radially from the ring. The blades may be solid or hollow as desired. The blade-mounting ring is an integral structure comprising an outer ring 8, a web 10, and an inner ring 11, the outer and inner rings ordinarily extending about equal distances to each side of the web 10. The blades 7 are welded by any suitable technique such as percussion or flash butt welding to the outer ring as indicated at 12 in FIG. 2.

The bladed ring is reinforced by two fibrous composite reinforcing rings 14 disposed at each side of web 10 and bearing on the inner ring 11 through standoff rings 15 as described in my two patent applications referred to above. The bladed ring structure as so far described is essentially the same as that of my companion application A–12,586.

Each spacer ring 4 or 5 includes an outer annulus portion 16 which may cooperate with the inner shroud of the stator blade row (not illustrated) for sealing purposes. The spacer rings 4 and 5 are similar in many parts of the structure, both having an inwardly directed web or flange 18 adjacent each end of the spacer ring which continues into an axially outwardly directed flange 19 which further continues into a radially inwardly directed flange 20. The fiber composite reinforcing ring 22 and the standoff ring 23 are seated on each flange 19. The rings 22 thus reinforce the spacer ring against centrifugal force.

Adjacent the web 18, the spacer ring 4 or 5 has an internal recess 24 within which is fitted a pilot 26 on the bladed ring. The two rings are thus in both axial and radial abutment at this point for alignment and to provide a rigid outer rotor skin which is substantially gas tight.

A continuous retainer ring 27, preferably of the cross section shown in FIG. 2, is disposed over part of flanges 19 and 20, with one edge bearing against the reinforcing ring 22 and standoff ring 23 and with the radial web of the ring impinged between the flange 20 and reinforcing ring 14. Ring 27 extends inward far enough to block any significant axial shifting of the standoff ring 15. In assembly of the rotor the reinforcing rings and standoff rings may be pressed or otherwise fitted onto the inner ring 11 and flange 19. The retainer ring 27 may then be put in place, and the bladed ring and spacer ring pushed together at the pilot 26.

The spacer ring 5 differs from the spacer ring 4 in the addition for further reinforcing of a web 28 extending radially inward from the midplane of ring 5, the web 28 terminating in forwardly and rearwardly directed flanges on which are mounted reinforcing rings 31 and standoff rings 32 of the same nature as those previously described. These are retained on the flanges 30 by any suitable means such as circumferentially spaced clips 34 which bear against the inner surface of flanges 30 and have flanges which bear against the axially outer ends of the reinforcing rings 31. Clips 34 may be tack-welded or cemented in place.

The rotor as a whole is held in assembled relation by coupling means which interconnect successive inner rings 11 of the blade mounting rings 6. Each end of the ring 11 bears on its inner surface a flange 35 (FIG. 2) having a conical back face 36. The ends of the ring 11 including flanges 35 are splined for mutual engagement with face splines 38 which preferably are of the type well known as a "Curvic" (trademark) coupling. These positively locate the successive rings with respect to each other and provide for transmission of torque between them. The Curvic couplings are held in engagement by coupling rings 39 preferably of the cross section clearly illustrated in FIG. 2, which have flanges 40 configured to bear against the back faces 36 on the inner rings 11. The coupling ring 39 is preferably a split ring but may be segmented and centrifugal force due to rotation of the rotor urges the ring into tighter engagement with the back face at 36, thus increasing the force holding the face splines in engagement as rotor speed increases. To maintain the engagement when the rotor is stationary, the coupling ring 39 is biased outwardly by expanding rings 42 of a snap-type lodged in grooves in the inner face of the ring 39. This provides a structure which is readily assembled at the inside of the rotor drum as the successive rings or sections are being put together.

The rearmost bladed ring 3 is joined by coupling means 39 of the type previously described to an end bell or conical shaft 44 which provides support for the high pressure end of the rotor. A similar, or different, shaft structure may be suitably coupled to the forward or low pressure end of the rotor.

The high pressure end of the hollow rotor drum structure is closed and the rear blade ring 3 is stabilized by an end ring 46 which may be generally similar in structure to one end of the spacer rings 4 and which serves the function of retaining the innermost reinforcing ring 14. As shown in FIG. 1, the rear inner edge of the end ring is piloted at 47 within a circumferential groove in the end bell 46 and its outer margin pilots over the bladed ring at 48.

Figure 3:
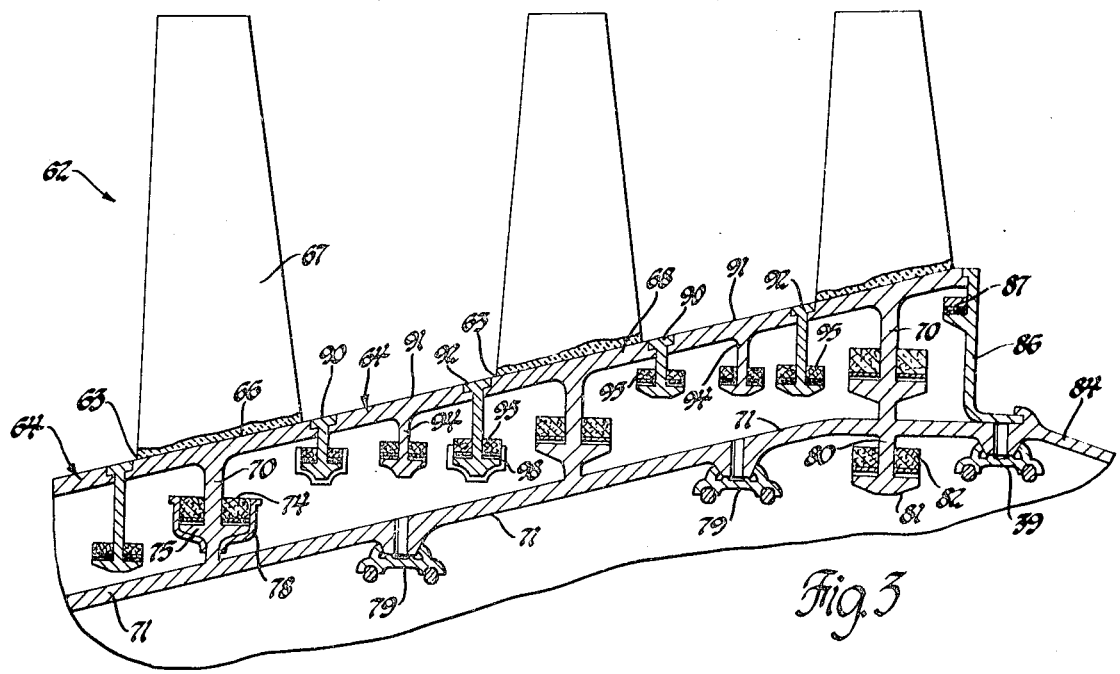
FIG. 3 is a view similar to FIG. 1 of a second form of rotor.
Figure 4:
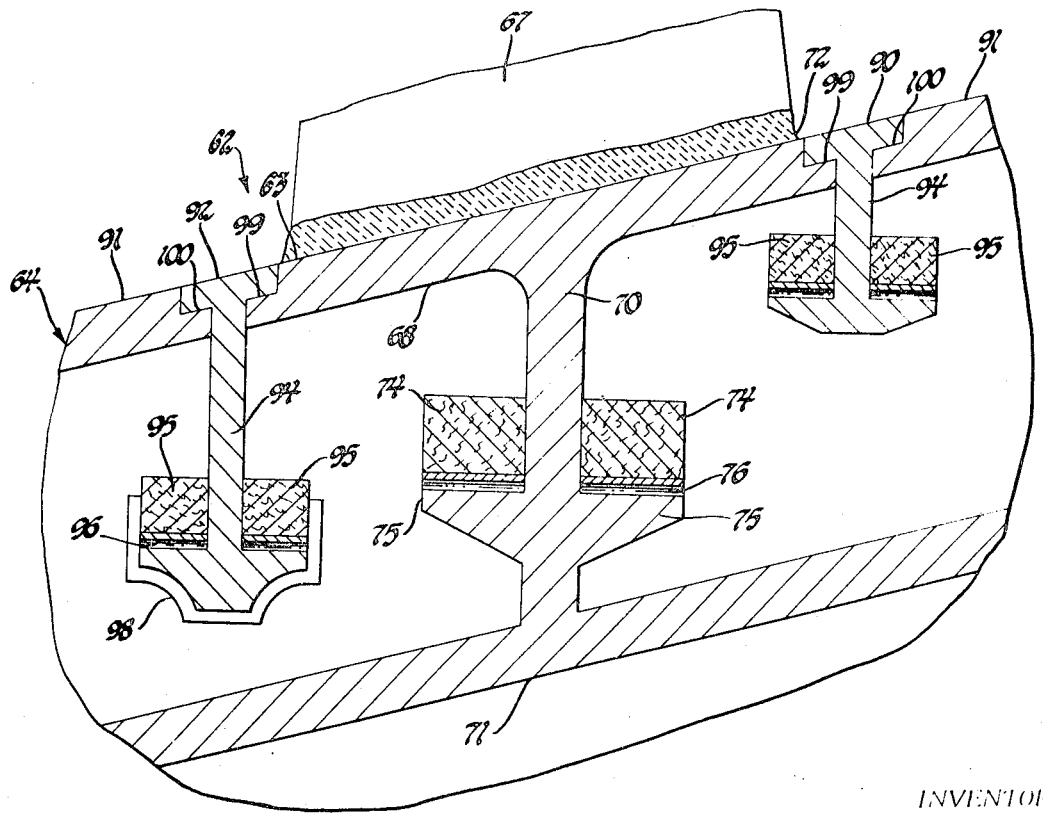
FIG. 4 is an enlarged view of a portion of FIG. 3.

FIGS. 3 and 4 show a different form of rotor drum structure in which the principles are much the same, and many of the elements of structure are the same, as in the rotor of FIGS. 1 and 2. Incidentally, FIGS. 3 and 4 show a rotor which increases in diameter toward the high pressure end, but this is immaterial. In either case the drum may converge, remain of constant diameter, or diverge toward the high pressure end.

The principal difference between the forms of FIG. 1 and FIG. 3 lies in different structure of the spacer rings. The rotor 62 of FIGS. 3 and 4 includes bladed rings 63 and spacer rings 64. Each bladed ring includes a blade-mounting ring 66 to which blades 67 are welded, specifically to an outer ring 68. A web 70 connects the outer ring 68 with an inner ring 71. The weld between the blades and outer rings is indicated at 72.

A pair of cylindrical seating surfaces for reinforcing rings 74 are provided by two flanges 75 extending axially from the web 70. Standoff rings 76 are provided as before. The reinforcing rings are held on the flanges 75 by any suitable device such as several clips 78 disposed around the circumference of the web 70. These clips may be tack-welded or cemented to the bladed ring.

The inner rings 71 are coupled together by a face splined end and coupling rings 79 to hold the splines in engagement as in the form of FIG. 1.

THe last stage of the rotor of FIG. 3 illustrates an additional reinforcing arrangement which may be installed where considered desirable. A web 80 within ring 71 aligned with web 70 is provided with flanges 81 bearing reinforcing rings 82 and standoff rings as previously described.

The last stage bladed ring is coupled by splines and coupling member 39 to an end bell 84. An end ring 86 bearing a reinforcing ring 87 is mounted between the outer ring 68 of the last stage and the end bell.

Considering now the spacer rings of the rotor of FIG. 3, each spacer ring is a composite structure made up of three axially aligned rings: a first ring 90 which directly engages the outer ring 66 of the immediately preceding bladed ring; a second ring 91; and a third ring 92 which engages the succeeding outer ring 68. Each of the first, second, and third rings is reinforced by an inwardly extending web 94 having forwardly and rearwardly projecting flanges with cylindrical outer surfaces on which are mounted reinforcing rings 95, each bearing on a standoff ring 96 as previously described. Circumferentially spaced clips 98 may be fixed to the inner periphery of each web 94 to hold the reinforcing rings in place.

In this form, as in the previous form, the marginal portions of the spacer rings 64 and, more specifically, the marginal portions of the rings 90 and 92 are piloted as indicated at 99 over the end of the bladed ring, thereby serving additionally to reinforce the bladed ring against the centrifugal pull of the blades. Similarly, the ends of second rings 91 are piloted as shown at 100 into the first and third rings.

With respect to both forms of the invention, it should be pointed out that there may be installations of the sort in which the standoff rings which are shown in connection with each reinforcing ring may be omitted. In any event, the standoff ring is a feature of one of my prior applications.

It will be apparent that the structure described provides well distributed reinforcing of the blade-carrying rings and the spacer rings and of the blade carrying rings from the spacer rings. The structure is readily fabricated and assembled. The well distributed small reinforcing rings provide a great deal of resistance to centrifugal force with a relatively small amount of weight and provides the strengthening at points spaced closely together along the rotor. The structure described provides a very convenient and effective means for coupling together the sections of a drum rotor.

The detailed description of preferred embodiments of the invention serve to illustrate the principles thereof. It will be apparent that many modifications of these structures may be made by the exercise of skill in the art and that the scope of the invention is not to be considered as restricted by the detailed description.

I claim:

1. A composite drum-type rotor structure for an axial flow turbomachine comprising, in combination, bladed rings, spacer rings, the bladed and spacer rings alternating axially of the rotor, and coupling means joining the rings together; each bladed ring comprising an outer ring, blades extending from the outer ring, an inner ring, a radial web connecting axially intermediate planes of the outer and inner rings, and a reinforcing ring disposed between the outer and the inner ring at each side of the web and coupled to the web; the spacer rings each including an outer annulus partially piloted over adjacent outer rings, axially extending flanges fixed to the outer annulus within the outer rings, and reinforcing rings disposed around and containing the flanges; the coupling means engaging and rigidly joining the said inner rings of adjacent bladed rings so as to contain the intermediate spacer ring between the bladed rings.

2. A structure as defined in claim 1 in which at least one spacer ring is a composite structure including three coaxial abutting rings and each said abutting ring includes a said flange contained by a said reinforcing ring.

3. A composite drum-type rotor structure for an axial flow turbomachine comprising, in combination, bladed rings, spacer rings, the bladed and spacer rings alternating axially of the rotor, and coupling means joining the rings together; each bladed ring comprising an outer ring, blades extending from the outer ring, an inner ring, a radial web connecting axially intermediate planes of the outer and inner rings, and a reinforcing ring disposed around and containing the inner ring at each side of the web; the spacer rings each including a body partially piloted over adjacent outer rings, flanges extending axially from the body within the outer rings, and reinforcing rings disposed around and containing the flanges; the coupling means engaging and rigidly joining the said inner rings of adjacent bladed rings so as to contain the intermediate spacer ring between the bladed rings.

4. A structure as defined in claim 3 in which at least one spacer ring includes a unitary body having a flange at each end and a flange intermediate the ends, and includes a reinforcing ring disposed around each said flange.

5. A composite drum-type rotor structure for an axial flow turbomachine comprising, in combination, bladed rings, spacer rings, the bladed and spacer rings alternating axially of the rotor, and coupling means joining the rings together; each bladed ring comprising an outer ring, blades extending from the outer ring, an inner ring, a radial web connecting axially intermediate planes of the outer and inner rings, and a reinforcing ring disposed around and containing the inner ring at each side of the web; the spacer rings each including a body partially piloted over adjacent outer rings, flanges extending axially from the body within the outer rings, and reinforcing rings disposed around and containing the flanges; the said flanges including a portion disposed to retain a reinforcing ring on the adjacent bladed ring the coupling means rigidly joining the said inner rings of adjacent bladed rings so as to contain the intermediate spacer ring between the bladed rings.

6. A composite drum-type rotor structure for an axial flow turbomachine comprising, in combination, bladed rings, spacer rings, the bladed and spacer rings alternating axially of the rotor, and coupling means joining the rings together; each bladed ring comprising an outer ring, blades extending from the outer ring, an inner ring, a radial web connecting axially intermediate planes of the outer and inner rings, flanges extending from each face of the web, and a reinforcing ring disposed around and containing the said flange at each side of the web; the spacer rings each including a body partially piloted over adjacent outer rings, flanges extending axially from the body within the outer rings, and reinforcing rings disposed around and containing the flanges; the coupling means rigidly joining the said inner rings of adjacent bladed rings so as to contain the intermediate spacer ring between the bladed rings.